(12) United States Patent
Russo et al.

(10) Patent No.: US 6,208,912 B1
(45) Date of Patent: Mar. 27, 2001

(54) ASSEMBLY FOR CONNECTING A MEASURING HEAD TO A MEASURING ROBOT

(75) Inventors: Domenico Russo, Moncalieri; Domenico Sola, Rivalta, both of (IT)

(73) Assignee: Brown & Sharpe DEA SpA, Moncalieri (IT)

( * ) Notice: Subject to any disclaimer, the term of this patent is extended or adjusted under 35 U.S.C. 154(b) by 0 days.

(21) Appl. No.: 09/321,122

(22) Filed: May 27, 1999

(30) Foreign Application Priority Data

May 29, 1998 (IT) .............................. TO98A0460

(51) Int. Cl.$^7$ ................................... G06F 19/00
(52) U.S. Cl. ......................... 700/245; 700/88; 700/182; 700/260; 700/262; 700/263; 318/568.11; 318/568.12; 318/568.13; 318/568.16
(58) Field of Search ..................... 700/254, 245, 700/260, 262, 263, 88, 182, 259; 318/568.1, 568.11, 568.12, 568.13, 568.16, 569; 901/8, 15, 34, 45; 264/315, 314; 439/191, 521; 73/152.57, 117; 483/55, 69

(56) References Cited

U.S. PATENT DOCUMENTS

| | | | |
|---|---|---|---|
| 4,706,372 | * 11/1987 | Ferrero et al. | 483/69 |
| 4,848,005 | * 7/1989 | Ercole et al. | 33/568 |
| 4,882,527 | * 11/1989 | Yakuyama et al. | 318/568.13 |
| 4,906,123 | 3/1990 | Weskamp et al. | 403/322.2 |
| 5,105,368 | * 4/1992 | Alexandersen et al. | 700/254 |
| 5,184,810 | 2/1993 | Lebrecht | 269/309 |
| 5,243,264 | 9/1993 | Takada et al. | 318/568.11 |

FOREIGN PATENT DOCUMENTS

| | | |
|---|---|---|
| 0151819 | 8/1985 | (EP) . |
| 0184568 | 6/1986 | (EP) . |
| 312 119 | * 3/1989 | (EP) . |
| 0429677 | * 6/1990 | (EP) . |
| 0450383 | 10/1991 | (EP) . |
| 0508598 | 10/1992 | (EP) . |
| 2176136 | 12/1986 | (GB) . |
| 2337744A | * 12/1999 | (GB) . |
| 2337745A | * 12/1999 | (GB) . |
| 4022077635A | * 3/1990 | (JP) . |
| 402224990A | * 9/1990 | (JP) . |
| 402231544A | * 9/1990 | (JP) . |
| 775906 | 9/1993 | (JP) . |
| 411063988A | * 3/1999 | (JP) . |
| 411064259A | * 3/1999 | (JP) . |
| 20000353A | * 2/2000 | (JP) . |
| 409908560A | * 2/2000 | (JP) . |

OTHER PUBLICATIONS

Xia et., Attenuation Predictions at Extremely Low Frequencies for Measurement–While Drilling Electromanetic Telementry System, IEEE., pp. 12221228.*

* cited by examiner

*Primary Examiner*—William A. Cuchlinski, Jr.
*Assistant Examiner*—McDieunel Marc
(74) *Attorney, Agent, or Firm*—Hall, Priddy, Myers & Vande Sande

(57) ABSTRACT

An assembly for connecting a measuring head to a measuring robot, the assembly having a flange integral with a supporting member of the measuring robot; isostatic supporting elements interposed between the measuring head and the flange; and a rotary ring nut carried by the flange and movable between an angular position permitting insertion of the head, and an angular position locking the head; the ring nut having elastic elements generating a preload on the isostatic supporting elements; and the isostatic supporting elements defining respective switches of an electric circuit forming part of a safety system for detecting shock on the head.

13 Claims, 4 Drawing Sheets

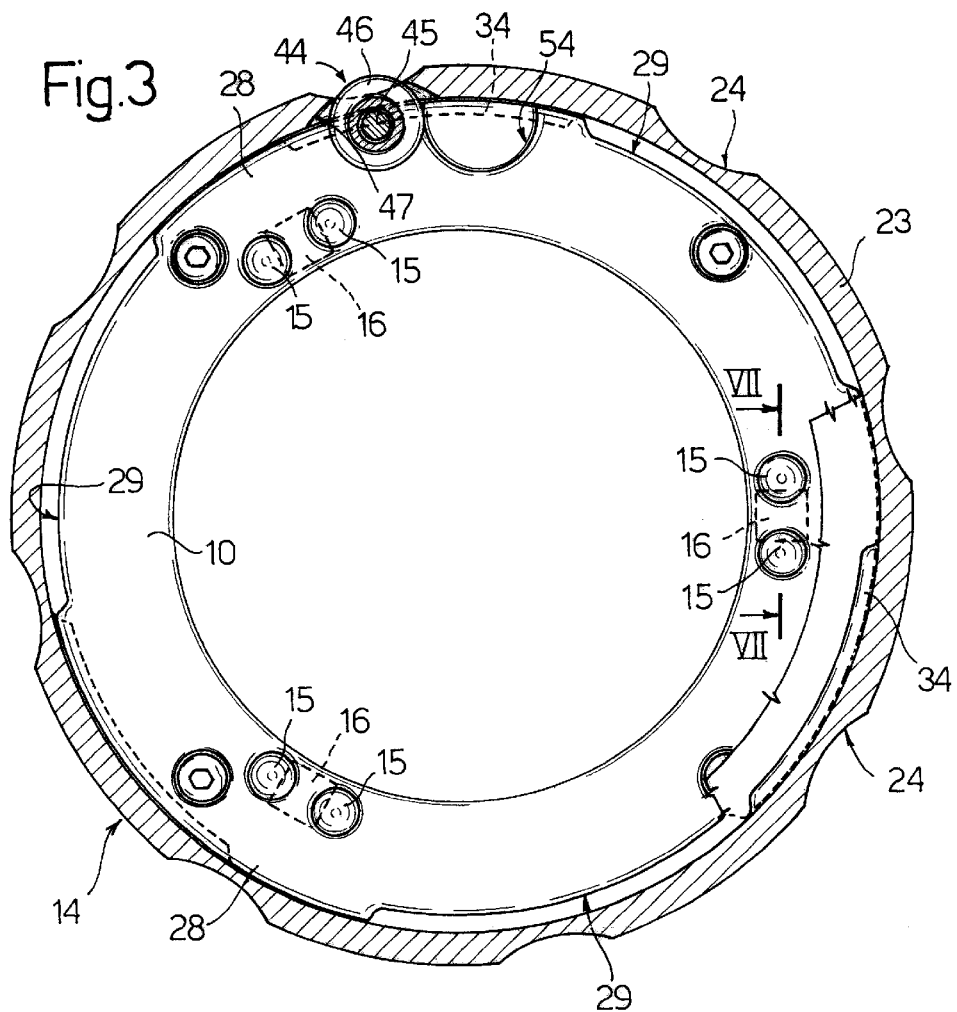
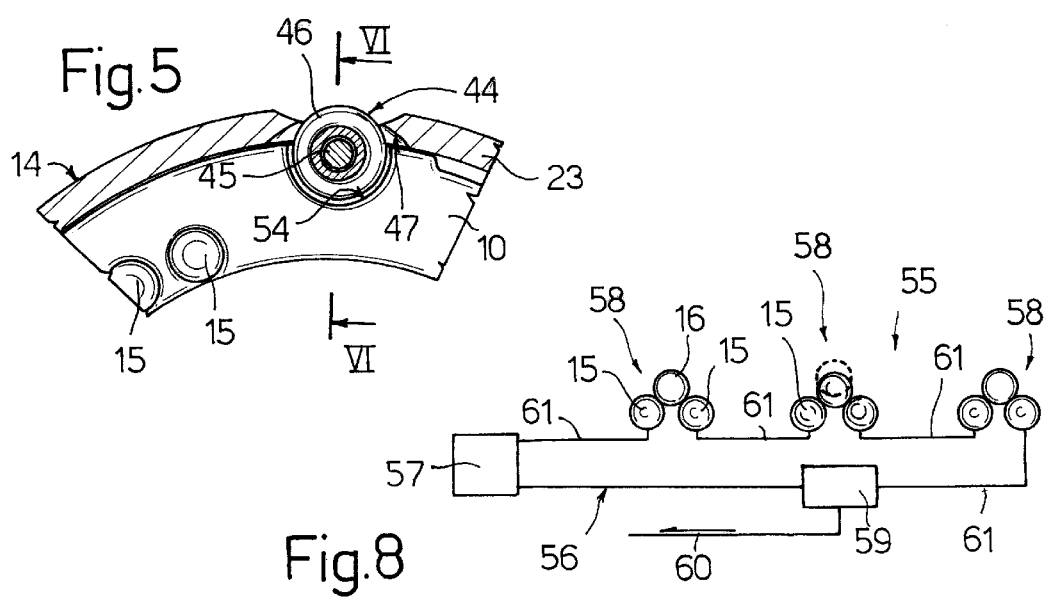

ASSEMBLY FOR CONNECTING A MEASURING HEAD TO A MEASURING ROBOT

The present invention relates to an assembly for connecting a measuring head to a measuring robot.

In the following description and in the Claims, the term "measuring head" is used in the widest sense to indicate any unit featuring a measuring stylus, regardless of configuration or number of axes. Similarly, the term "robot" is used to indicate any unit for moving a measuring head along a number of coordinate axes, regardless of configuration or number of axes.

The invention may be used conveniently, but not exclusively, for connecting a two-axis articulated head (sometimes referred to as "wrist") to a measuring robot.

BACKGROUND OF THE INVENTION

A measuring head is normally connected to a measuring robot using a connecting assembly comprising a first and a second flange respectively integral with a supporting member of the measuring robot and with the measuring head, and which rest one on the other; and locking means for locking the flanges to each other.

The locking means may comprise straightforward screws or more complex locking members requiring a special wrench for assembly and disassembly. Whichever the case, known connecting assemblies require the use of tools to lock and release the head, so that assembling and disassembling the head are relatively long, painstaking jobs.

SUMMARY OF THE INVENTION

It is an object of the present invention to provide a connecting assembly permitting maximum positioning precision and repeatability, and which at the same time is fast and easy to use and, in particular, provides for assembling and disassembling the measuring head rapidly with no tools required.

According to the present invention, there is provided an assembly for connecting a measuring head to a supporting member of a measuring robot, of the type comprising:
- a first connecting member integral with said supporting member of said measuring robot;
- first supporting means carried by said first connecting member;
- a second connecting member integral with said measuring head;
- second supporting means carried by said second connecting member and cooperating with said first supporting means; and
- locking means interposed between said first and said second connecting member to keep said first supporting means and said second supporting means contacting each other;

characterized in that said first and said second supporting means define a substantially isostatic constraint between said first and said second connecting member; said locking means comprising a ring nut carried by one of said first and second connecting members and rotating about a respective axis between a first release position permitting relative movement between said first and said second connecting member along said axis of said ring nut, and a second angular lock position; said assembly comprising elastic means interposed between said ring nut and said second connecting member in said second angular lock position of said ring nut to generate an elastic load to keep said first and said second supporting means in contact with each other.

According to a preferred embodiment of the present invention, said first and said second supporting means define a number of electric switches connected in series and normally closed in the assembly position of the measuring head, so as to define a safety or anticrash system for detecting any collision of the measuring head.

BRIEF DESCRIPTION OF THE DRAWINGS

A preferred, non-limiting embodiment of the present invention will be described by way of example with reference to the accompanying drawings, in which:

FIG. 3 shows a section along line III—III in FIG. 2, with parts removed for clarity;

FIG. 5 shows a detail of FIG. 3 in a different operating position;

FIG. 8 shows, schematically, an emergency circuit associated with the FIG. 2 assembly.

DETAILED DESCRIPTION OF THE INVENTION

Figure 1:
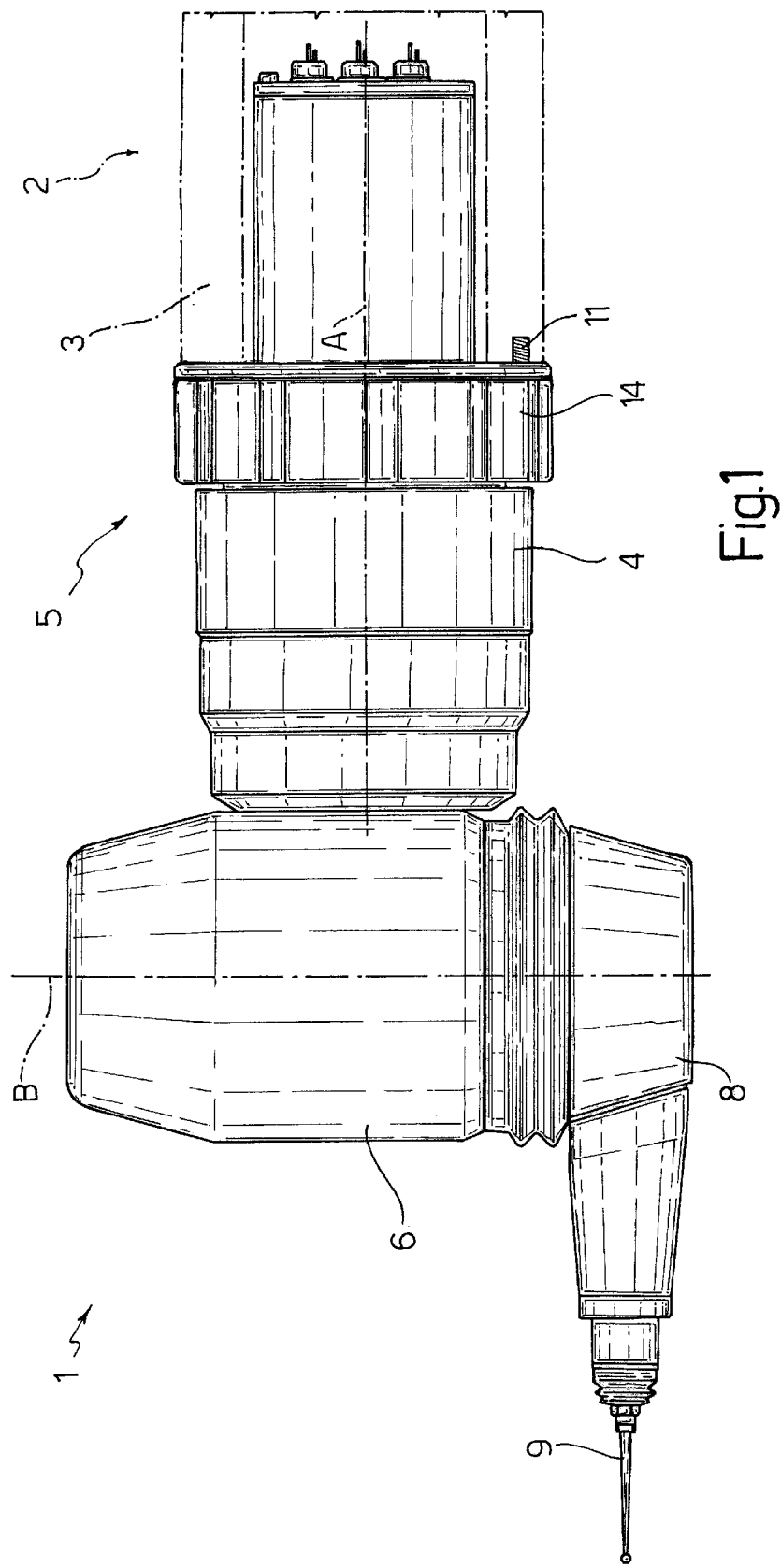
FIG. 1 shows an elevation of a measuring head with a connecting assembly in accordance with the teachings of the present invention.

Number 1 in FIG. 1 indicates as a whole a measuring head for a measuring robot 2, of which is shown partially a supporting portion 3.

Head 1 comprises in known manner a substantially tubular first body 4, of axis A, which is connected to supporting portion 3 of robot 2 by an assembly 5 forming the object of the present invention.

Head 1 also comprises a second body 6, which is supported in projecting manner by the first body and is rotated with respect to the first body and about axis A by a first known actuating and control device housed inside first body 4 and not shown by not forming part of the present invention.

The second body in turn carries a measuring tool 8 having a stylus 9. The measuring tool is supported in projecting manner, and is rotated with respect to second body 6 and about an axis B perpendicular to axis A by a second actuating and control device (not shown) housed inside second body 6.

The connecting assembly 5 (FIG. 2) substantially comprises a fixed annular flange 10 connected rigidly to supporting portion 3 of robot 2 by means of screws 11; an annular wall 12 of first body 4 cooperating with fixed flange 10 by means of three angularly equally spaced supports 13; and a ring nut 14 carried by fixed flange 10 and rotating between a release position (FIG. 3) —enabling head 1 to be fitted to and removed from supporting portion 3 —and a lock position.

Each support 13 is defined by two balls 15 fitted to flange 10 and spaced circumferentially; and by a cylinder 16, which is fitted to annular wall 12 of first body 4, with its own axis oriented radially with respect to first body 4, and which cooperates with and defines respective contact points with the two balls.

Balls 15 and cylinders 16 are housed partly inside respective locating seats formed respectively on flange 10 and on wall 12, and are conveniently fixed by means of adhesive.

The three supports 13 combine to define a substantially isostatic constraint between wall 12 and flange 10, and prevent any movement (translation and rotation) in a plane perpendicular to axis A.

At each support 13, wall 12 has a respective radial appendix 20; and each appendix 20 carries a supporting cylinder 21 having a radial axis and housed partly inside a respective seat 22. In this case, too, cylinder 21 is conveniently fixed by means of adhesive.

Figure 4:
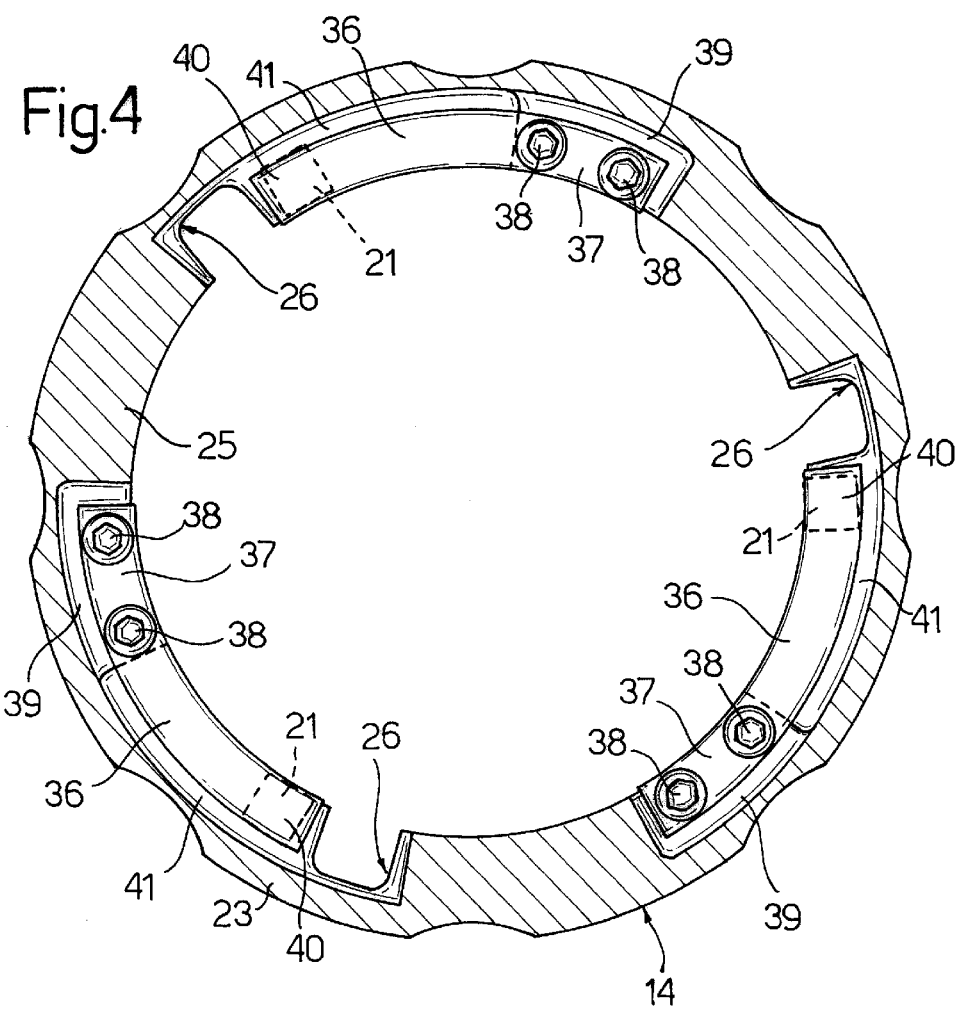
FIG. 4 shows a section along line IV—IV in FIG. 2, with parts removed for clarity.
Figure 7:
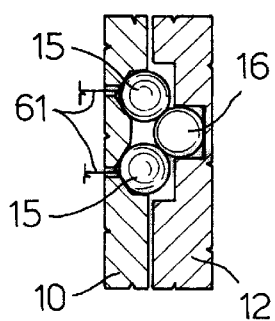
FIG. 7 shows a partial section along line VII—VII in FIG. 3.

Ring nut 14 (FIG. 3) has a substantially cylindrical lateral wall 23 with outer impressions 24 for easy handling; and an inner annular end wall 25 extending from the axial end of lateral wall 23 opposite the end facing flange 10. Wall 25 has three cavities 26 (FIG. 4) for the passage of appendixes 20 when head 1 is fitted to flange 10.

Ring nut 14 and flange 10 are secured axially to each other by means of respective inner and outer radial toothings shown more clearly in FIG. 3.

More specifically, flange 10 comprises an external toothing consisting of a number of, e.g. three, teeth 28 forming gaps 29, each of a circumferential extension equal to that of each tooth (60° in the example shown). Flange 10 also comprises a continuous circumferential projection 30 (FIG. 2) spaced axially with respect to teeth 28 so as to form, with teeth 28, seats 31 for the teeth of ring nut 14.

The innner toothing of ring nut 14 comprises a number of teeth 34 equal in number to teeth 28 (e.g. three) but of a smaller circumferential extension to enable ring nut 14 to be fitted axially onto flange 10 by inserting teeth 34 of ring nut 14 through gaps 29 between teeth 28 of flange 10, and then rotating ring nut 14 so that teeth 34 are superimposed axially on teeth 28 (FIG. 3).

Following assembly, two threaded pins 35 (only one shown in FIG. 2) are screwed through flange 10, and interfere with teeth 34 of ring nut 14 to limit the angular travel of teeth 34 between a release position and a lock position and prevent ring nut 14 from being positioned with teeth 34 aligned with gaps 29 and so withdrawn axially.

Ring nut 14 has three bend springs 36 for producing the axial load by which to lock head 1 to supports 13.

Springs 36 (FIG. 4) are leaf springs of curved elongated shape, so as to be housed along annular wall 25 of ring nut 14. More specifically, each spring 36 has one end 37 fitted to wall 25 by two screws 38 at a supporting region 39 substantially half-way between two cavities 26, projects along wall 25—provided, for the purpose, with a respective sunken portion 41—and terminates with a free end 40 located close to a respective cavity 26 and which, in use, cooperates elastically with a respective supporting cylinder 21 as described in detail later on.

Figure 6:
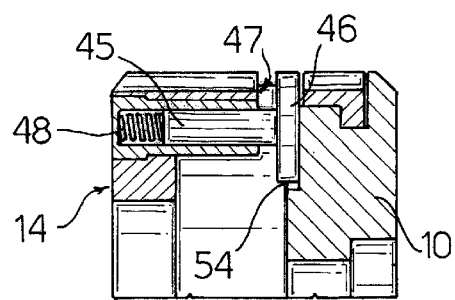
FIG. 6 shows a section along line VI—VI in FIG. 5.

Ring nut 14 also has an antirelease device 44—shown in FIGS. 5 and 6—substantially comprising a pin 45 with its axis parallel to axis A and fitted in axially-sliding manner adjacent to lateral wall 23 of ring nut 14. Pin 45 has a circular head 46 of such a diameter as to project radially through a milled portion 47 of lateral wall 23 of ring nut 14, and is loaded axially by a spring 48 towards flange 10 against which head 46 rests axially.

Flange 10 has a circular sunken seat 54 into which head 46 of pin 45 clicks to define the angular lock position of ring nut 14 with respect to flange 10.

Finally, connecting assembly 5 comprises a safety system 55 shown schematically in FIG. 8.

System 55 substantially comprises an electric circuit 56 in turn comprising a voltage source 57 for generating a direct reference voltage; three normally-closed switches 58 in series with one another; and a voltage sensor 59 connected to the robot control unit (not shown) and for generating an open-circuit logic 0 signal 60 in the event at least one of switches 58 is open.

Each switch 58 is defined by balls 15 and respective cylinder 16 of a respective support 13. More specifically, balls 15 define a pair of fixed contacts of each switch, and respective cylinder 16—which is made of conducting material—defines a bridge-contact element for closing the circuit between the respective pair of balls when resting correctly on each ball.

Figure 2:
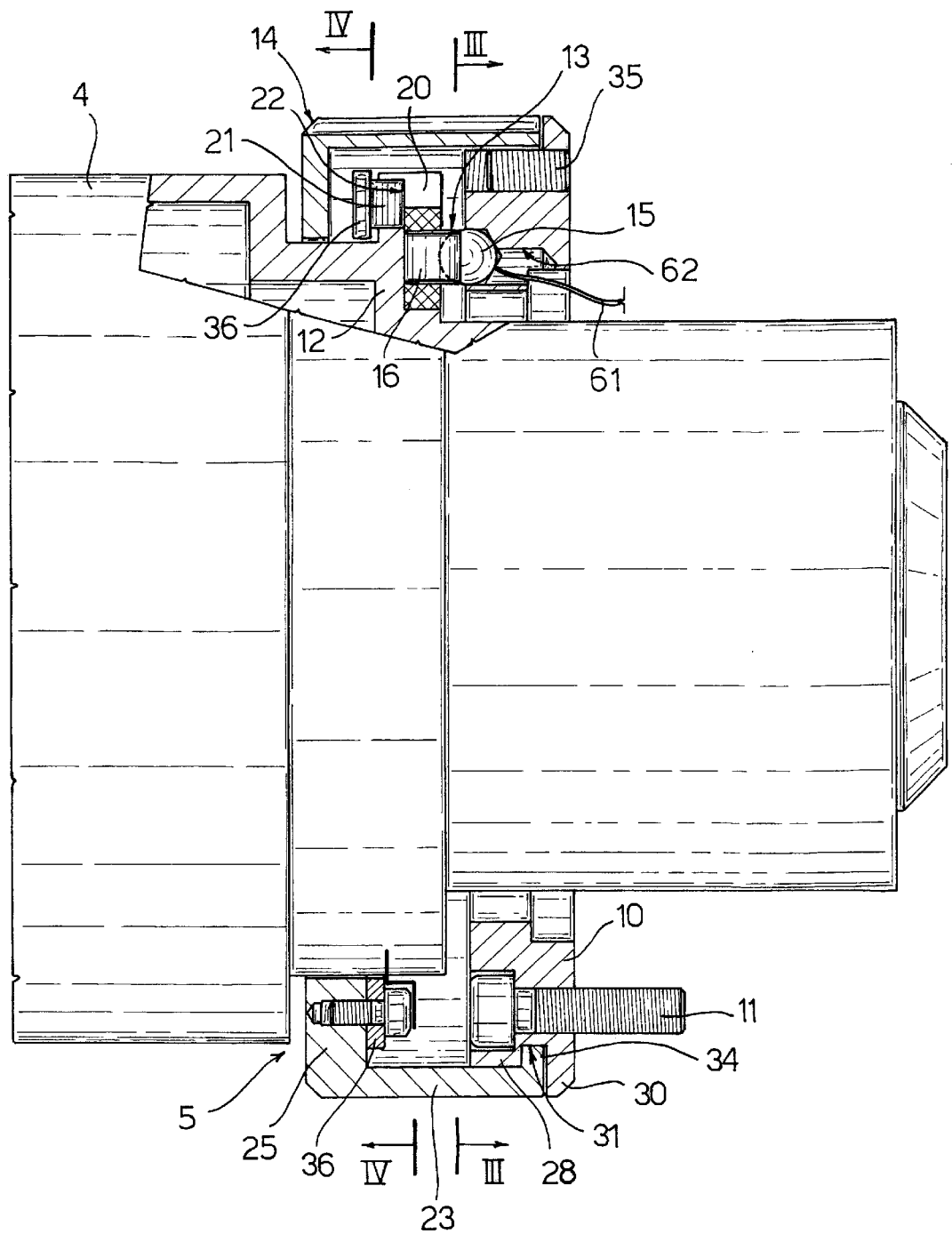
FIG. 2 shows a larger-scale, partially sectioned view of the connecting assembly according to the invention, and of an associated portion of the measuring head.

Balls 15 are connected electrically by electric cables 61, which are soldered to the balls and extend through respective holes 62 in flange 10 (FIG. 2).

Balls 15 are made of conducting material and conveniently insulated with respect to flange 10, e.g. by means of nonconducting paint only applied to the supporting region and not, obviously, to the region contacting cylinder 16.

Sensor 59 is subjected to the reference voltage and generates a logic 0 signal 60 when all three switches 58 are closed, and is subjected to zero voltage and generates a logic 1 signal when at least one of switches 58 opens.

Operation of connecting assembly 5—which is partly self-explanatory from the foregoing description—is as follows.

Head 1 is fitted to flange 10 already fitted beforehand with ring nut 14, which is set to the release position—that is, the position enabling insertion of head 1—in which cavities 26 of ring nut 14 face respective pairs of balls 15, so that, as head 1 is inserted, radial appendixes 20 of wall 12 fit axially through cavities 26 of wall 25 of ring nut 14.

Upon cylinders 16 of s supports 13 contacting respective pairs of balls 15, ring nut 14 may be rotated manually about 15° clockwise with reference to the FIG. 3 position , so that head 46 of pin 45 clicks inside seat 54 to lock ring nut 14 angularly with respect to flange 10 (FIG. 5). In this position, the respective free ends 40 of springs 36 contact respective supporting cylinders 21, and the springs bend elastically to transmit an elastic load to first body 4 to maintain contact between pairs of balls 15 and respective cylinders 16 of supports 13.

In the event of shock on head 1 in use, at least one of supports 13 loses contact (FIG. 8)—this being permitted by the flexible axial lock provided for by assembly 5 by virtue of the flexibility of springs 36—and the interruption in the circuit is detected by sensor 59 which sends an emergency signal 60 to the control unit.

Head 1 is disassembled equally rapidly by backing head 46 of pin 45 manually out of seat 54 (operation which can be easily carried out by means of the thumb while gripping ring nut 14) and rotating the ring nut in the opposite direction to previously.

The advantages of connecting assembly 5 according to the present invention will be clear from the foregoing description.

In particular, head 1 is fitted to and removed from the measuring robot quickly and easily by hand with no tools required.

Moreover, supports 13 define an isostatic constraint for ensuring maximum repeat positioning of head 1 with respect to supporting member 3.

Finally, supports 13 themselves define respective switches of an emergency anticrash circuit, which function is therefore achieved simply, using a minimum number of dedicated components.

Clearly, changes may be made to assembly 5 without, however, departing from the scope of the accompanying claims.

What is claimed is:

1. An assembly (5) for connecting a measuring head (1) to a supporting member (3) of a measuring robot (2), of the type comprising:

a first connecting member (10) integral with said supporting member (3) of said measuring robot (2);

first supporting means (15) carried by said first connecting member (10);

a second connecting member (12) integral with said measuring head (1);

second supporting means (16) carried by said second connecting member (12) and cooperating with said first supporting means (15); and locking means (14) interposed between said first and said second connecting member (10, 12) to keep said first supporting means (15) and said second supporting means (16) contacting each other;

characterized in that said first and said second supporting means define a substantially isostatic constraint between said first (10) and said second (12) connecting member; said locking means comprising a ring nut (14) carried by one (10) of said first and second connecting members (10, 12) and rotating about a respective axis (A) between a first release position permitting relative movement between said first and said second connecting member along said axis (A) of said ring nut (14), and a second angular lock position; said assembly (5) comprising elastic means (36) interposed between said ring nut (14) and said second connecting member (12) in said second angular lock position of said ring nut (14) to generate an elastic load to keep said first and said second supporting means (15, 16) in contact with each other.

2. An assembly as claimed in claim 1, characterized in that said ring nut (14) is carried in angularly-free, axially-fixed manner by said first connecting member (10).

3. An assembly as claimed in claim 2, characterized in that said ring nut (14) and said first connecting member (10) have respective teeth (34, 28) defining a relative axial constraint.

4. An assembly as claimed in claim 2, characterized by comprising releasable retaining means (44) angularly securing said ring nut (14) and said first connecting member (10) in said second angular lock position of said ring nut (14).

5. An assembly as claimed in claim 4, characterized in that said releasable retaining means comprise an engaging element (45, 46) carried by said ring nut (14) and movable axially; a spring (48) acting on said engaging element (45, 46) to exert thrust towards said first connecting member (10); and a seat (54) formed in said first connecting member (10) and into which said engaging element (45, 46) is clicked by said spring (48).

6. An assembly as claimed in claim 1, characterized in that said first and second supporting means (15, 16) define three angularly equally spaced supports (13).

7. An assembly as claimed in claim 6, characterized in that each of said supports (13) comprises a pair of balls (15) spaced apart; and a cylinder (16), a lateral surface of which cooperates with said balls.

8. An assembly as claimed in claim 7, characterized in that said first supporting means are defined by said pairs of balls (15), and in that said second supporting means are defined by said cylinders (16).

9. An assembly as claimed in claim 1, characterized by comprising a shock-detecting safety system (55) comprising a circuit (56) having a number of electric switches (58) connected in series with one another and each having respective first and second contact means (15, 16) carried by said first connecting member (10) and said second connecting member respectively, and detecting means (59) for detecting the electric continuity of said electric circuit (56).

10. An assembly as claimed in claim 9, characterized in that said first and second contact means are defined by said first and second supporting means (15, 16).

11. An assembly as claimed in claim 1, characterized in that said elastic means interposed between said ring nut and said second connecting member comprise a number of leaf springs (36) carried by said ring nut (14); and a number of third supporting means (21) integral with said second connecting member (12) and cooperating with said leaf springs (36) in said second angular lock position of said ring nut (14).

12. An assembly as claimed in claim 11, characterized in that said leaf springs (36) are fitted in projecting manner to said ring nut (14) and extend in a circumferential direction.

13. An assembly as claimed in claim 12, characterized in that said third supporting means are defined by cylinders (21) having respective axes oriented radially with respect to said ring nut (14), and cooperating with respective free ends (40) of said leaf springs (36).

* * * * *